Nov. 9, 1954  A. DEAN, JR  2,693,653
VEHICLE OPERATED BUMP GATE
Filed March 5, 1951  3 Sheets-Sheet 1
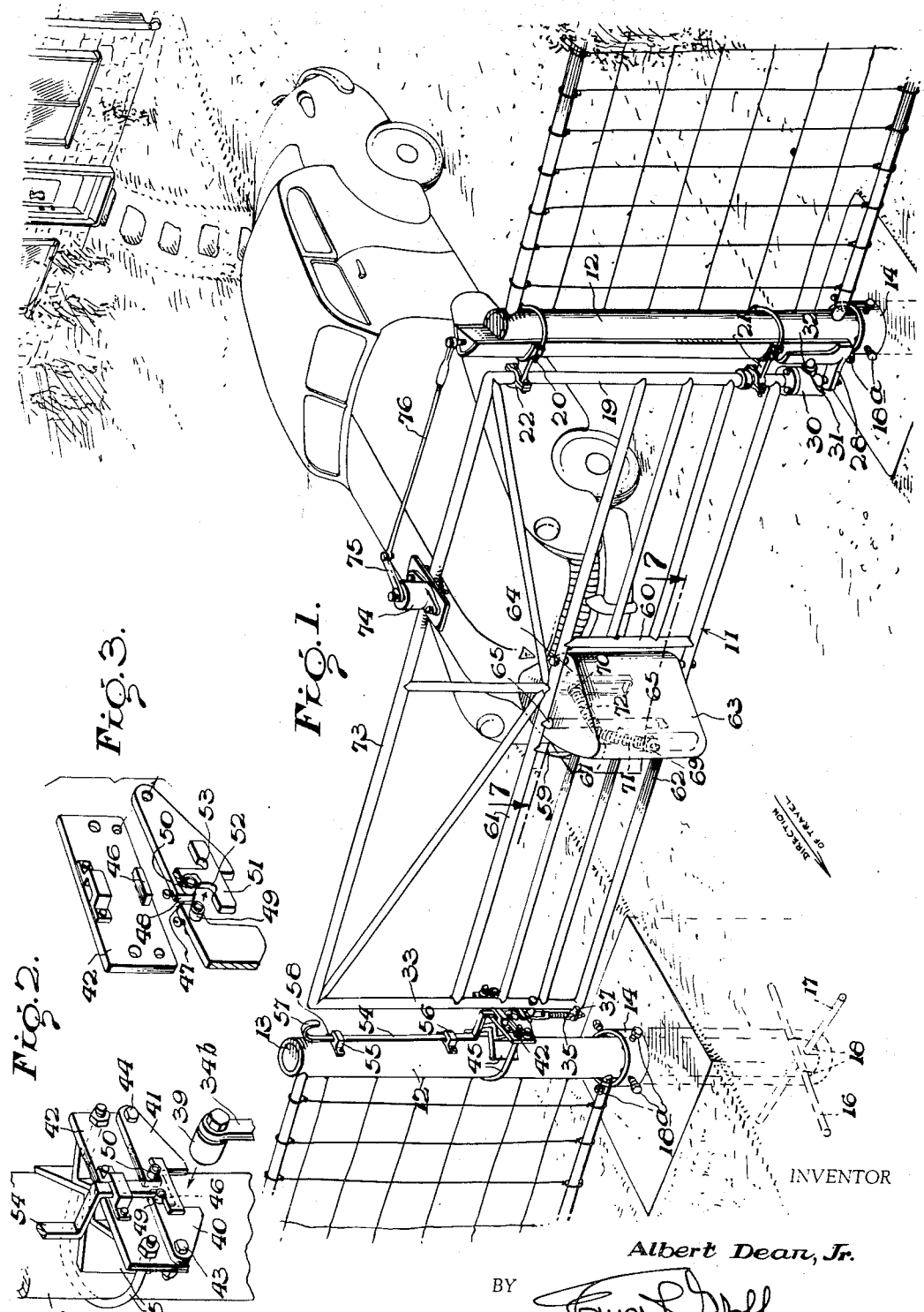
INVENTOR
Albert Dean, Jr.
BY
ATTORNEY Nov. 9, 1954 A. DEAN, JR 2,693,653
VEHICLE OPERATED BUMP GATE
Filed March 5, 1951 3 Sheets-Sheet 2
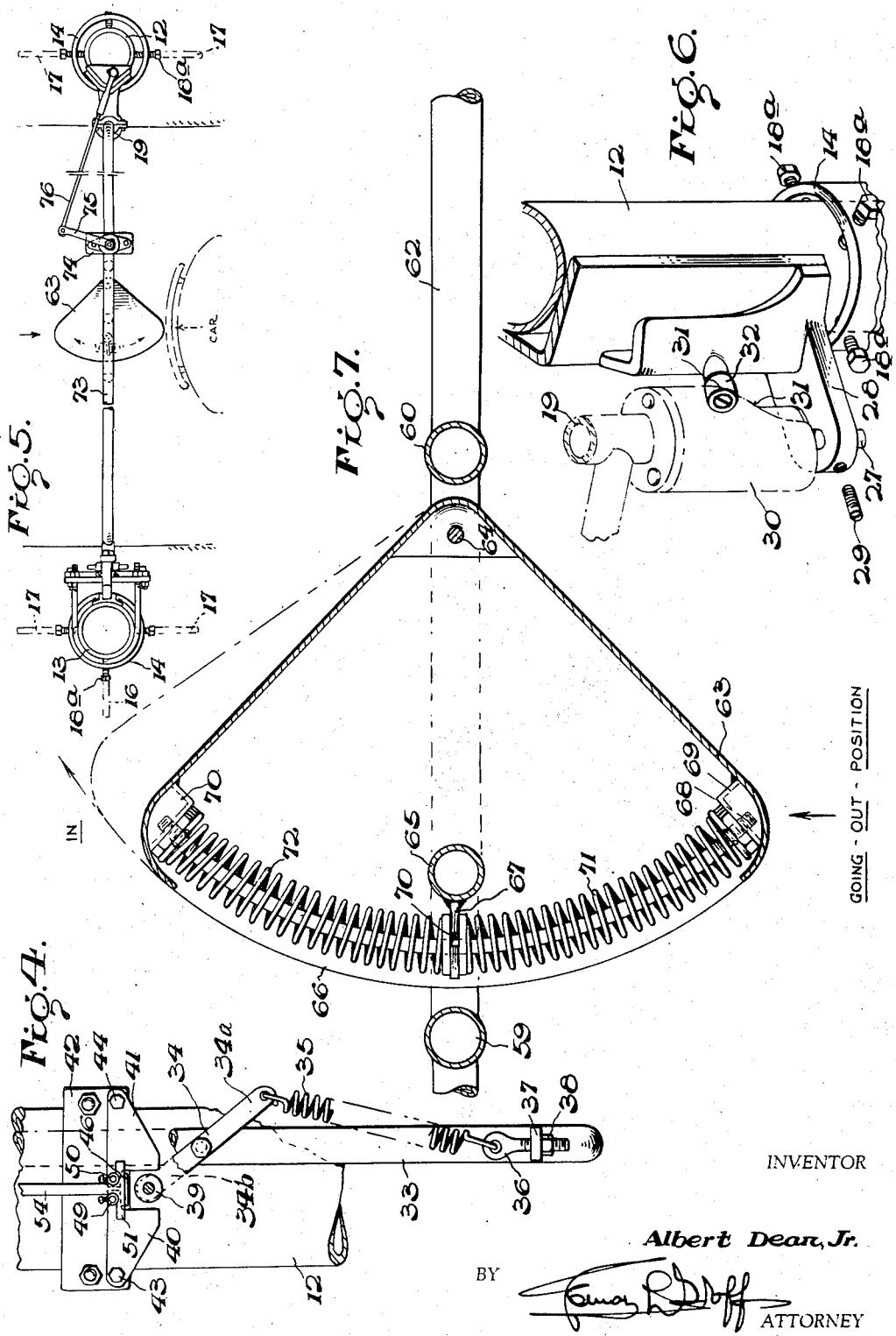
INVENTOR
Albert Dean, Jr.
BY 
ATTORNEY Nov. 9, 1954      A. DEAN, JR      2,693,653
VEHICLE OPERATED BUMP GATE
Filed March 5, 1951      3 Sheets-Sheet 3
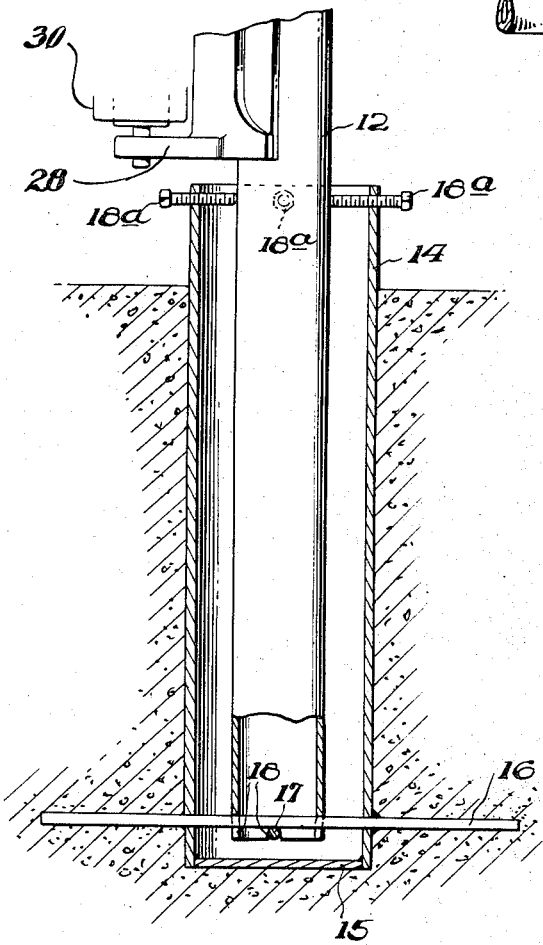
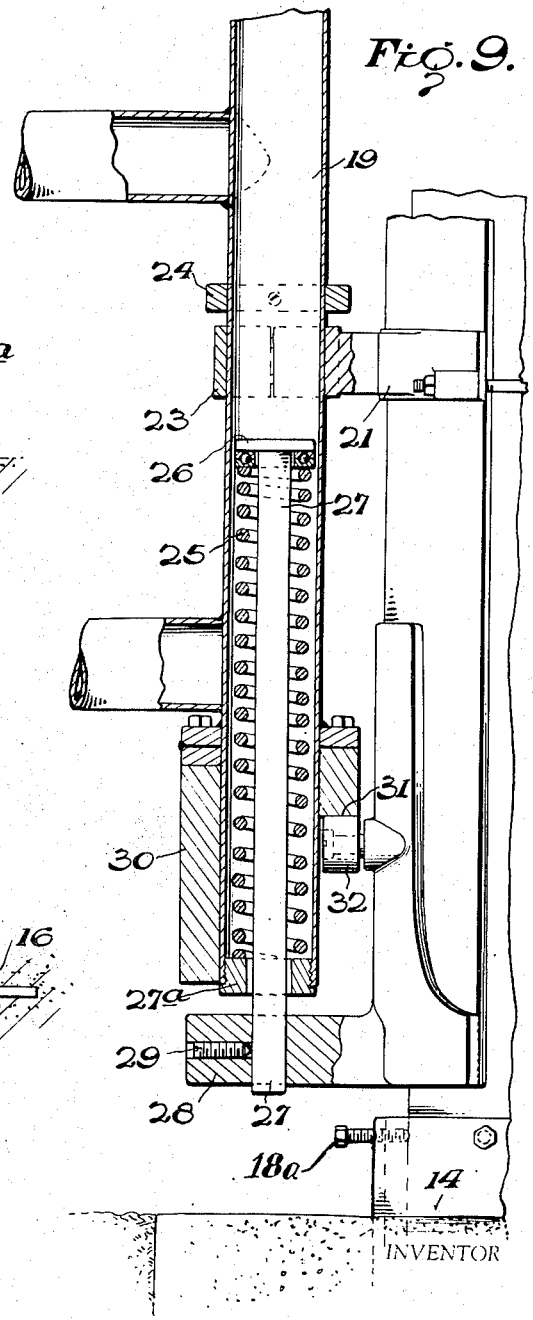
INVENTOR
Albert Dean, Jr.
BY 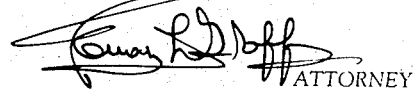
ATTORNEY

United States Patent Office 2,693,653
Patented Nov. 9, 1954

2,693,653

VEHICLE OPERATED BUMP GATE

Albert Dean, Jr., San Antonio, Tex.

Application March 5, 1951, Serial No. 213,941

8 Claims. (Cl. 39—31)

This invention relates to swinging gates and is more particularly concerned with gates adapted to be disposed across a highway and which can be automatically opened by pressure applied to either side of the gate, such as by an automobile or other vehicle, and which automatically closes without any further manipulation thereof.

In providing gates of the type mentioned, one of the difficulties resides in the fact that after the gate is opened the automatic means for closing it goes into operation immediately after the gate is opened or after the pressure used to open it is released. As a result, the vehicles intending to pass through the opened gate often do not have sufficient time to do so before the gate closes. Consequently, the vehicle in passing through the gate is frequently struck by the gate as it is closing, resulting in damage to the vehicle or to the gate, or both. This deficiency is more severe in the case of long vehicles or combinations of vehicles such as trucks, tractors and trailers, farming equipment, etc. Accordingly, one of the principal objects of this invention is the provision of a gate of the type mentioned which functions in such a manner as to permit vehicles of all types to pass through without danger of being struck by the gate in closing.

Another object of the invention is the provision of such a gate which opens quickly but has a definite time lag in closing so as to avoid collision with a vehicle passing therethrough.

A further object of the invention is the provision of a gate with delayed closing action in which the time lag can be adjusted for different types of vehicles.

A further object is the provision of a gate which can be opened either automatically by a vehicle or manually by a person on foot.

A still further object is the provision in combination with a quick opening gate of the type mentioned of a dash pot element to retard the gate against action of positive means for closing it.

A still further object is the provision of a gate of the type mentioned which is securely anchored in the ground and so designed as to resist damage under repeated impacts to which it is normally subjected in being opened and closed.

A still further object is to provide such a gate with means for adjusting it to proper position should it become misaligned while in use.

The invention is described hereinafter more fully, in which reference is made to the accompanying drawing and further objects and advantages will appear therefrom.

In the drawing:

Figure 1 is a perspective view of a gate illustrating an embodiment of this invention and showing a vehicle in position relative thereto for opening the gate.

Figure 2 is an enlarged fragmentary perspective view of the latch mechanism.

Figure 3 is an enlarged perspective view showing details of some of the parts of the latch mechanism.

Figure 4 is an enlarged elevational view of the latch mechanism.

Figure 5 is a top plan view of the gate partly broken away.

Figure 6 is an enlarged perspective view of a portion of the dash pot and mounting therefor.

Figure 7 is a horizontal section along the line 7—7 of Figure 1.

Figure 8 is an enlarged vertical section showing the means for adjustably mounting the hinge post of the gate in the ground.

Figure 9 is an enlarged vertical section of the vertical frame member adjacent the hinge post illustrating the construction thereof and the manner of attaching it to the hinge post.

Referring with more particularity to the drawing in which like numerals designate like parts, the embodiment illustrated comprises a hinge gate 11 mounted between a hinge post 12 and a latch post 13. Said posts are each adjustably mounted in the ground by means of a hollow cylinder or caisson 14 having an open top projecting above the ground level and a closed bottom 15. Horizontal cross rods 16 and 17 are disposed through the bottom section of each caisson and extend radially outwardly a substantial distance in the surrounding soil to steady and hold firm the caisson in the ground. The bottom of each post is provided with vertical slots 18, which fit over the rods 16 and 17 and are held thereby to position the posts substantially coaxial with the caissons. The top of the caissons are provided with radial adjusting screws 18ª which abut the posts and thereby permit the setting of each post at a true vertical position.

The gate is hinged to the hinge post 12 by pivotally mounting thereon the adjacent hollow vertical frame member 19 of the gate. This is done by means of brackets 20 and 21 secured to the hinge post and extending inwardly. The inner ends of the brackets are provided with bearings 22 and 23, respectively, which pivotally engage the frame member 19. A stop collar 24 is secured to the frame member above the bearing 23 to limit downward movement of the gate relative to the post 12.

The lower section of the member 19 is hollow and contains a stiff vertical coil spring 25. The upper end of the coil spring is secured to a collar 26 which, in turn, is secured to the upper end of a vertical shaft 27. The lower end of the spring is attached to a collar 27ª that is secured to the lower end of the member 19. The shaft 27 is disposed within the coil spring and extends from the top to the bottom, then through the collar 27ª and projects beyond the bottom of the frame member 19 to engage a bracket 28 secured to the hinge post. The lower end of the shaft is adjustably secured to the bracket 28 by means of a set screw 29 or by any other suitable means.

About the exterior of the frame member 19 a cylinder 30 is secured. A portion of said cylinder is cut away to provide a cam surface 31, substantially as shown, in contact with a vertical roller 32 mounted on the post 12. When the gate is in its normally closed position the roller 32 contacts the cam surface 31 at its highest point. From this point the cam surface extends downwardly on either side through an arc of about 90 degrees. By these means, when the gate is opened in either direction, the action of the cam surface on the roller causes the gate to gradually raise relative to the hinge post 12. During the opening of the gate in this way, the coil spring 25 is tensioned so that when the gate is fully open the action of the spring plus the weight of the gate acting on the roller through the cam surface in contact therewith tends to urge the gate to its closed position.

The latch mechanism of the gate is associated with the latch post 13 and the adjacent vertical frame member 33 of the gate. The said frame member 33 carries a pivoted lever 34 which is normally vertical. Said lever is biased in the vertical position by means of a coil spring 35 having one end connected to the lower arm 34ª of the lever. The other end of the coil spring 35 is attached to a bolt 36 which is mounted on a lug 37 of the frame member 33 and provided with an adjusting nut 38 below the said lug. Consequently, by adjusting the position of the nut 38 on the bolt 36 tension in the spring 35 may be varied.

The upper arm 34ᵇ of the lever 34 carries a roller 39 which is normally disposed between a pair of latch guide plates 40 and 41. Said guide plates are each in the general shape of a right triangle with the hypotenuse facing downwardly and outwardly. The outer ends of said guide plates are pivoted to a mounting plate 42 by means of bolts 43 and 44. The mounting plate 42 is attached to a bracket 45 on the latch post 13, substantially as shown. A stop lug 46 is secured to the mounting plate 42 between inner projections 47 and 48 of the gate plates in order to hold them in the horizontal position. Extending outwardly from the projections 47 and 48 are lugs 49 and 50 under which there is disposed a bar 51 having recesses 52 and 53 to engage said lugs 49 and 50, respectively. The lifting bar 51 is attached to the end or integral with a vertical lifting rod 54 which is slidably mounted on the post 13 in brackets 55 and 56. The upper end of the rod 54 is provided with a curved portion 57 to facilitate lifting it manually and with an abutment lug 58 to prevent it from dropping down too far.

The gate 11 is further constructed so as to provide a vertical opening at the center, such as that between inner vertical frame members 59 and 60 and horizontal frame members 61 and 62. In this center opening there is pivotally disposed a hollow triangular shaped bump member 63 which is pivoted along one corner to the gate by means of a vertical shaft 64, said shaft being attached between the horizontal frame members 61 and 62. Within the hollow triangle member 63 there is mounted a vertical member 65, said member being also secured to the frame members 61 and 62. The side 66 of the member 63 opposite the shaft 64 is circular, the center of curvature thereof being substantially coincident with the pivot point of said member. The post 65 is provided with a radial abutment member 67 projecting toward the side 66. A curved rod 68 parallel to the curvature of the side 66 is disposed within the member 63 adjacent and parallel to said side 66 by securing the ends thereof in bosses 69 and 70. Said curved rod 68 also slidably engages an aperture 70 in said abutment member 67. A coil spring 71 is mounted between the boss 69 and abutment member 67 and another coil spring 72 is mounted between the boss 70 and the abutment member 67, substantially as shown.

The upper horizontal frame member 73 of the gate has secured to it a double acting dash pot member 74 such as an ordinary shock absorber or door check having an operating arm 75. Said arm is connected to the post 12 by means of an adjustable link 76. The relation between the arm 75 and link 76 is such that in the neutral or normally closed position of the gate these two members are at an angle of approximately 90 degrees with each other.

In actual operation, a vehicle slowly applies pressure against the pivoted member 63, such as by forcing the bumper of a car against it. As this pressure is applied, one of the springs 71 or 72, depending upon which side of the member 63 is being engaged by the vehicle, will become compressed and result in the application of a force against the abutment member 67 which is transmitted to the gate through the post 65. The application of this pressure also causes the lever 34 to pivot since the force will act through the gate on said lever at its pivoted point. Since the roller 39 at the upper end of the lever is in contact with one of the plates 40 or 41, as the case may be, this action causes the gate to move from its normally closed position and thereby causes the lever 34 to pivot on the gate against the action of the spring 35. As the force applied by the vehicle increases, the gate moves farther and farther until the lever 34 is pivoted to a position whereby the roller 39 is below the corresponding gate plate 40 or 41. When this happens, the gate springs open free of the latch means. As the gate opens, it is elevated because of the action of the caming surface 31 on the roller 32 as previously described.

After the gate is opened, it is prevented from closing immediately by the action of the dash pot 74, thereby permitting the vehicle to pass through the gate unharmed. For different lengths of vehicles, the dash pot may be adjusted to provide different time lags.

In returning to its closed position the gate, under the delaying action of the dash pot 74, will reach the point where the roller 39 will strike the diagonal undersurface of the guide plate 40 or 41. This causes the guide plate to pivot upward thereby permitting the roller to pass beneath and stop when it abuts the other guide plate, whereupon the first guide plate drops down into its normally closed position. This action is the same irrespective of which side of the gate the vehicle is on.

Should a person on foot desire to open the gate, he lifts the bar 54 which causes the guide plates 40 and 41 to be pivoted upwardly about the bolts 43 and 44 thereby freeing the roller 39 and permitting the gate to be pushed open.

Although in the embodiment described above and illustrated in the drawing, the bumper member is shown as a hinged element, it is apparent that other methods of resiliently supporting a bumper member to obtain equivalent results may be used.

I claim:
1. A swinging gate adapted to be operated by a vehicle, comprising, a gate member, a bumper member carried by and movable relative to the gate member, resiliently yieldable means for holding said bumper member in a neutral position relative to the gate, a latch mechanism for normally holding said gate in a closed position and releasing said gate when pressure is applied to the gate through said bumper member against the action of said yieldable means, said mechanism comprising a lever pivotally carried by the gate, said lever having an upper arm and a lower arm, resiliently yieldable means for holding said lever in a substantially vertical position, a roller carried by the upper arm of said lever, a stationary member adjacent said lever, said member including means for holding said roller when said lever is in a vertical position and for releasing said roller when said lever is pivoted to a position between the vertical and the horizontal.

2. A swinging gate adapted to be operated by a vehicle, comprising, a gate member, a hinge post for swingingly supporting said gate, means, including a cam, for elevating said gate relative to said post when the gate is opened, a coil spring associated therewith and means for tensioning said coil spring when the gate is open so as to urge said gate to its closed position, a bumper member carried by and movable relative to the gate, resilient means for urging said bumper member to a neutral position, a latch mechanism for normally holding said gate in a closed position and releasing said gate when pressure is applied to the gate through said bumper against the action of said resilient means, said mechanism comprising a lever pivotally carried by the gate, said lever having an upper arm and a lower arm, resiliently yieldable means for holding said lever in a substantially vertical position, a roller carried by the upper arm of said lever, a stationary member adjacent said lever, said stationary member including means for holding said roller when said lever is in a vertical position and for releasing said roller when said lever is pivoted to a position between the vertical and horizontal.

3. A swinging gate as defined by claim 1 having a dash pot between the gate member and the hinge post to delay the closing action of the gate.

4. A swinging gate adapted to be operated by a vehicle, comprising, a gate member, a hinge post for swingly supporting said gate, means, including a cam, for elevating said gate relative to said post when the gate is opened, a coil spring associated therewith and means for tensioning said coil spring when the gate is open so as to urge said gate to its closed position, a bumper member carried by and movable relative to the gate, resilient means for urging said bumper member to a neutral position, a latch mechanism for normally holding said gate in a closed position and releasing said gate when pressure is applied to the gate through said bumper against the action of said resilient means, said mechanism comprising a lever pivotally carried by the gate, said lever having an upper arm and a lower arm, resiliently yieldable means for holding said lever in a substantially vertical position, a roller carried by the upper arm of said lever, a latch post adjacent said lever, means associated with said latch post for holding said roller when said lever is in a vertical position and for releasing said roller when said lever is pivoted to a position between the vertical and the horizontal, means for adjustably supporting said latch post and hinge post, said means comprising a hollow cylindrical member adapted to be embedded in the ground, horizontal radial rods projecting through the bottom of said cylindrical member, the bottom of each post having slots adapted to engage and rest on said rods and radial set screws at the top of said cylindrical member adapted to adjustably abut said posts.

5. A swinging gate adapted to be operated by a vehicle, comprising, a gate member, a hinge post for swingingly supporting said gate, means, including a cam, for elevating said gate relative to said post when the gate is opened, a coil spring associated therewith and means for tensioning said coil spring when the gate is open so as to urge said gate to its closed position, a bumper member carried by and movable relative to the gate, resilient means for urging said bumper member to a neutral position, a latch mechanism for normally holding said gate in a closed position and releasing said gate when pressure is applied to the gate through said bumper against the action of said resilient means, said mechanism comprising a lever pivotally carried by the gate, said lever having an upper arm and a lower arm, resiliently yieldable means for holding said lever in a substantially vertical position, a roller carried by the upper arm of said lever, a stationary member adjacent said lever, a pair of spaced pivoted latch guides on said stationary member, said roller being disposed between said guides and means for manually pivoting said guides in a position free of said roller.

6. A latch mechanism for a swinging bumper gate comprising a lever carried by the gate at the outer swingable end thereof and pivoted thereto about a horizontal axis perpendicular to the swing axis of the gate, said lever having an upper arm and a lower arm, resiliently yieldable means for holding said lever in a substantially vertical position, a roller carried by the upper arm of the lever, a stationary member adjacent said lever, a pair of spaced latch guides on said stationary member, said roller in the normally closed position of the gate being disposed between said guides, whereby lateral pressure against the gate from either side will force the roller against one of the guides and cause the lever to pivot against the action of said resiliently yieldable means until the roller becomes disengaged from the guide, whereupon the lever will return to its normally vertical position under the action of said resiliently yieldable means.

7. In combination with a swinging bumper gate, a latch mechanism comprising a lever pivotally carried by the gate at the outer swingable end thereof, said lever having an upper arm and a lower arm, resiliently yieldable means for holding said lever in a substantially vertical position, a roller carried by the upper arm of said lever, a latch post adjacent said lever in the closed position of the gate, means connected to the latch post for holding said roller when said lever is in a vertical position and for releasing said roller when said lever is pivoted in either direction to a position between the vertical and horizontal.

8. In combination with a swinging bumper gate, a latch mechanism comprising a lever pivotally carried by the gate at the outer swingable end thereof, said lever having an upper arm and a lower arm, resiliently yieldable means for holding said lever in a substantially vertical position, a roller carried by the upper arm of said lever, a latch post adjacent said lever in the closed position of the gate, a pair of latch guide plates carried by the post, said plates being spaced apart in a direction at right angles to the plane of the gate, the space between said plates being for the reception of the roller in the closed position of the gate, said plates being pivotally connected at their outer ends to the latch post and having their bottom edges sloping upwardly and outwardly, horizontal lugs secured to the inner ends of said plates and projecting outwardly from the face thereof, a horizontal bar against the bottom of said lugs, means for holding said bar in a fixed position relative to the lugs, and means for manually moving the bar vertically to elevate the lugs and inner ends of the plates to release the roller from the plates.

References Cited in the file of this patent

UNITED STATES PATENTS

| Number | Name | Date |
|---|---|---|
| 615,950 | Barger | Dec. 13, 1898 |
| 1,099,026 | Crawford-Frost | June 2, 1914 |
| 1,136,102 | Clapcott | Apr. 20, 1915 |
| 1,180,814 | Ziganek | Apr. 25, 1916 |
| 1,232,340 | Lehson | July 3, 1917 |
| 1,596,388 | Barnhart | Aug. 17, 1926 |
| 1,648,691 | Matthews | Nov. 8, 1927 |
| 2,062,738 | Bigler | Dec. 1, 1936 |
| 2,076,092 | Pinard | Apr. 6, 1937 |
| 2,086,061 | Barr | July 6, 1937 |
| 2,118,722 | Bock | May 24, 1938 |
| 2,538,470 | Peeples | Jan. 16, 1951 |
| 2,585,481 | Martin | Feb. 12, 1952 |